June 12, 1962    E. H. THOMPSON    3,039,023
MONITORING CIRCUIT FOR 3-PHASE SUPPLY SYSTEMS
Filed Nov. 3, 1958    3 Sheets-Sheet 1
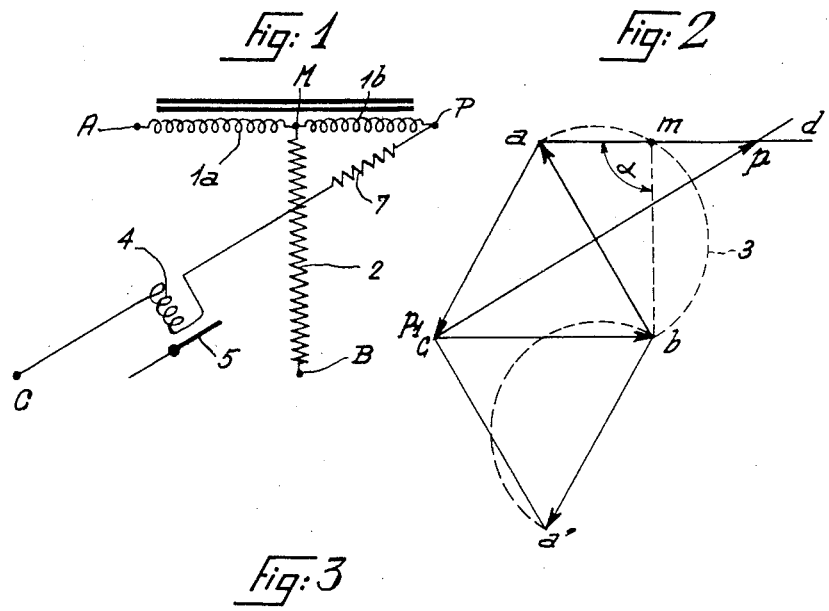
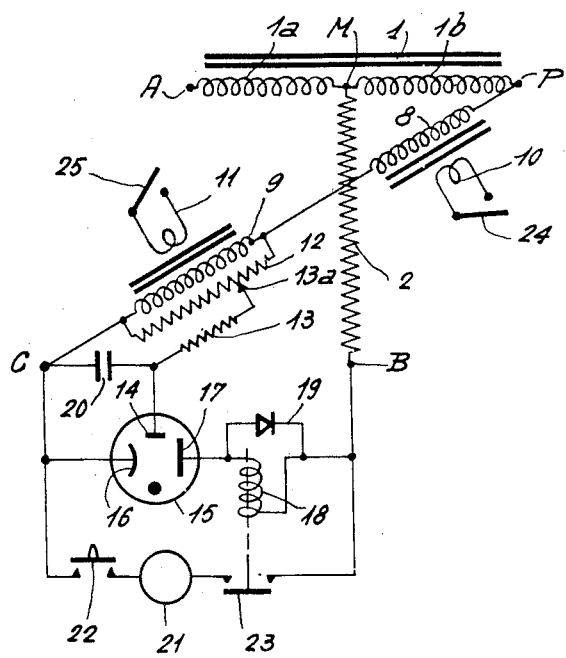
Inventor:
Eugene H. Thompson
by Robert Henderson
attorney June 12, 1962  E. H. THOMPSON  3,039,023
MONITORING CIRCUIT FOR 3-PHASE SUPPLY SYSTEMS
Filed Nov. 3, 1958  3 Sheets-Sheet 2

Inventor:
Eugene H. Thompson
by Robert Henderson
Attorney

3,039,023
MONITORING CIRCUIT FOR 3-PHASE SUPPLY SYSTEMS

Eugène H. Thompson, Nanterre, France, assignor to La Telemecanique Electrique, Nanterre, France, a company of France
Filed Nov. 3, 1958, Ser. No. 771,314
Claims priority, application France Nov. 29, 1957
6 Claims. (Cl. 317—48)

This invention relates to monitoring circuits of the type used for the protection of electrical apparatus supplied from three-phase supply networks against the harmful effects of a lack of voltage on one of the line phases and/or reversal in the order of the phases. Monitoring circuits of this type generally include phase-lag networks connected across the line phases and arranged to deliver a compound voltage acting on a voltage-responsive device controlling the input supplied to the load apparatus to be monitored.

It is an object of this invention to provide such a monitoring circuit which, in the normal condition in which all the phase voltages are present and in the proper order of phase rotation, will be capable of delivering a compound voltage of much higher magnitude than the interphase line voltage, and which, in the faulty condition of one phase being out or the phase order being reversed, will deliver a zero or substantially zero voltage.

It is, consequently, an object to provide a monitoring circuit which will be capable of using a wide variety of types of voltage-responsive devices for controlling the load input, without critical adjustment.

In accordance with an aspect of the invention, the improved monitor circuit of the phase-displacement type comprises an autotransformer having one end connected to a first phase terminal of the supply line and having an intermediate tap connected with one end of a resistance the other end of which is connected to another supply phase terminal, and voltage-responsive means connected at least in part between a third phase terminal and the other end of the autotransformer.

Preferably, the portion of the autotransformer included between the end thereof connecting with the first supply phase and the intermediate tap is equal to not more than one half, and preferably equals one third, of the full value of the autotransformer.

As will be shown in the ensuing disclosure, the voltage appearing between the third supply phase and the related end of the autotransformer is displaced in substantially 30° phase leading relationship to the voltage across the second and third supply phases. Acccordingly, in a preferred embodiment of the invention, the voltage-responsive means includes a voltage divider connected between the third phase terminal and the outer end of the autotransformer, while a circuit including the discharge space of a gas-discharge tube e.g. of the "thyratron" type is connected between the second and third line phase terminals and the voltage of a suitable point of the voltage divider is applied to the auxiliary anode or control electrode of said gas discharge tube. It is known that the above indicated conditions wherein the voltage is of large magnitude and is displaced in about 30° leading relation to the main voltage applied to the thyratron tube, are especially favourable for satisfactory operation and high energy yield in such a tube.

According to another preferred feature of the invention, connected in the output of the discharge tube is a relay controlling the load input supply, preferably having a rectifier shunted across it for maintaining the relay in an energized condition preventing it from vibrating during the non-conductive semi-cycles of the discharge tube.

A circuit of the kind described provides a convenient means of monitoring the operation of the load system in response to any number of additional arbitrarily selected conditions, by selectively preventing the voltage tapped from the voltage divider from being applied to the control electrode even in cases where the order of phase rotation is normal and a maximum voltage is present across the ends of the voltage divider.

However, in view of the high impedance which has to be imparted to such a voltage divider, it is not possible to connect any branch or shunt circuits thereto without disturbing the operation of the system. In order to obviate this difficulty, in accordance with the invention, the voltage divider is made to comprise one or more series inductances coupled to at least one winding having a small number of turns. In other words, the voltage divider includes the primary winding of at least one high-ratio step-down transformer, the secondary of which may be open or short circuited as required in accordance with one or more selected controlling conditions or factors. Since the impedance of a transformer primary is high when the secondary is open-circuited and very low when the secondary is shorted, the arrangement described makes it possible to vary over a wide range the total impedance of the voltage divider or of each of the two parts of it on opposite sides from the tap connected to the control electrode of the tube. Specifically, each of the two parts of the voltage divider can be made to include the primary of a related transformer so that the impedance of each part can be varied in a wide range independently of that of the other part. Thus, the voltage divider portion from which the voltage input applied between the cathode and control electrode of the gas discharge tube is derived, can have its impedance greatly reduced by short-circuiting its secondary, so that the potential drop across said impedance is insufficiently high to fire the tube, and the latter is thus made inoperative, e.g. for a particular range of variation of the controlling factor.

Conversely, the other voltage divider portion which determines the potential of the voltage tap with respect to the potential at the corresponding extremity of the divider, may be so predetermined that in the open-circuit condition of the related secondary the voltage drop across said impedance will lower the potential at the tap below the necessary firing value. Thus by shorting the secondary, the value of said impedance is decreased and the tap potential is raised to fire the thyratron.

It will be appreciated that the above arrangement provides two different methods of introducing as many additional conditions as may be desired in the operation of the circuit, since any desired number of low-inductance secondary windings can be coupled to the series-connected primaries comprising the voltage divider.

Such a system is applicable with especial advantage to three-phase powered pumping installations wherein the pumps must only be operated if all the supply phases are under supply in the correct order of rotation (since a reverse rotation of the pump motors would result in cutting-off the liquid supply to the pumps), and, moreover, pump operation must only be possible if the following two additional conditions are satisfied, namely, that an overhead reservoir into which the liquid is being pumped is substantially empty, and a well from which the liquid supply is derived is substantially full.

Where the pumped liquid is water, a substantial short-circuiting of the secondary windings for the purposes of the invention can conveniently be obtained in response to the variations in the water level with respect to stationary electrodes positioned at predetermined depths in the well and in the reservoir. In such case the circuit of the invention provides two further advantages: First, the induced secondary voltages, in view of the small number of turns therein, are very low thus averting electrocution hazards in use, and, secondly, insulation resistance becomes practically unimportant since it will always be higher than the low resistance value of the short-circuit.

The ensuing description made with reference to the accompanying drawings given by way of illustration but not of limitation, will provide a clear understanding of the manner in which the invention may be carried into practice.

FIG. 1 is a circuit diagram of one simple form of a monitor circuit according to the invention.

FIG. 2 is a vector diagram relating to the circuit of FIG. 1.

FIG. 3 illustrates a more elaborate form of the monitor circuit of the invention.

Figure 4:
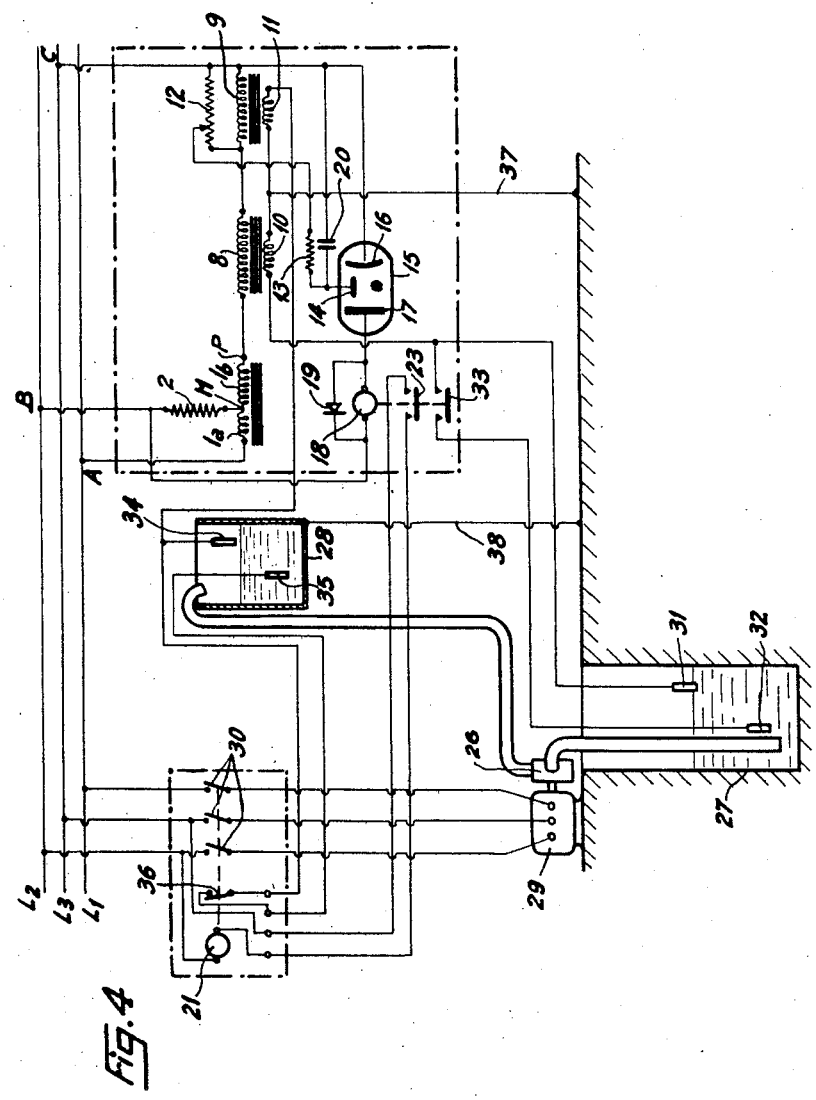
FIG. 4 illustrates the application of the circuit of the invention in monitoring a pumping system.

Referring first to FIGS. 1 and 3, a three-phase power distribution network is assumed to be connected to the three terminals A, B, C. For clarity these terminals have been illustrated in the drawings as disposed at the apices of an equilaterial triangle, that is, their arrangement in FIGS. 1 and 3 is an image of the voltage vector diagram of the voltages applied to said three terminals in the normal order of rotation of the phases. The corresponding voltage vector diagram is shown as the triangle $abc$ in FIG. 2. The voltage across A and B corresponds to the vector $ba$, the voltage across B and C corresponds to the vector $cb$ and the voltage across C and A corresponds to vector $ac$.

Furthermore, in FIGS. 1 and 3, the circuit elements have been shown as so disposed that their positions correspond in direction to the voltage vectors applied to them.

Referring to FIG. 1, connected to terminal A is one end of an autotransformer 1 having an intermediate tap M. This tap is connected to the line terminal B by way of resistance 2. Between the line terminals A and B there is thus provided a phase displacement network including in series the inductive reactance $1a$ and resistance 2. Assuming the inductive reactance is practically purely inductive, the point $m$ which in the diagram of FIG. 2 represents the voltage at point M, is positioned on the semi-circumference 3 drawn externally of the triangle $abc$, since the voltage in reactance $1a$ is in leading relation to the voltage in resistance 2.

It will be noted however that the voltage present at points of the autotransformer portion $1b$ beyond tap M is higher than the voltage $am$ and in phase therewith, that is, the representative points for such voltages will be positioned on the straight line $d$ extending the vector $am$ beyond the semicircumference 3.

It will be readily apparent that if the resistance value R of resistance 2 is selected equal to $L\omega\sqrt{3}$, where L is the inductance of transformer portion $1a$ and $\omega$ is $2\pi$ times the supply frequency, and assuming the tap M is at the center of the transformer, i.e. both inductances $1a$ and $1b$ are equal, then the point $p$ representing the voltage at P, will be symmetrical with respect to point $c$ on the other side of vector $ab$.

Hence, when the phases are following one another in the normal order of rotation $abc$, the voltage between C and P equals $cp$ or $U\sqrt{3}$, where U is the interphase voltage, while with the order of phase rotation reversed, the line phases would be represented by the triangle $a'bc$, symmetrical with respect to triangle $abc$, so that the point $p$ would be displaced to the position $p_1$ (since it has retained its relative position with respect to the vector $ba$, now at $ba'$), and thus coincides with the point $c$. In other words, when the order of phase rotation reverses the voltage between points $c$ and $p$ is switched from the value $U\sqrt{3}$ to zero.

Moreover, in case of inadequate voltage on any one of the three phases ABC (e.g. cut-off in a line conductor), it is readily seen that the voltage between C and P is greatly reduced.

This high variation in voltage between the normal and abnormal operating conditions of the supply system can be used to operate any suitable means responsive to the voltage and arranged to exert control over the load apparatus. Thus, as shown in FIG. 1, such a means may simply comprise a relay having its high-impedance winding 4 connected across C and P, while the relay armature 5 actuates the load circuit. If necessary, one or more resistances such as 7 may be provided for increasing the total impedance of the circuit CP. It should be noted that the maximum difference in the voltage drop between C and P is only obtained in the open circuit condition (infinite impedance) and that said difference is reduced when the impedance of the circuit branch CP is of finite value.

In practice, as shown in FIG. 3, it is advantageous in order to take into account the fact that the reactance of the autotransformer is not purely inductive, to select the position of its tap M at a position somewhat closer to A than to P. The portion $1a$ may represent about one third of the autotransformer 1. Since the inductive reactance possesses non-negligible ohmic reactance, the angle $\alpha$ between the voltage vectors $am$ and $mb$ is obtuse rather than right. The circuits shown in FIGS. 1 and 3 provide an output voltage $cp$ which not only is greater than the interphase voltage but is, moreover, in phase-leading relation to the voltage $cb$.

In a preferred form of embodiment of the invention, as already indicated, the voltage $cp$ is used to control the operation of gas discharge tubes or thyratrons having their anode-cathode discharge paths connected between the phases C and B. Such a circuit arrangement is shown in FIG. 3. Connected between the points C and P is a voltage divider which essentially comprises two inductive impedances connected in series. Each inductance comprises a primary winding having a large number of turns, respectively 8 and 9, and a secondary having a small number of turns and low resistance, respectively designated 10 and 11. To facilitate adjustment of the voltage tapped from the divider, the primary 9 has a potentiometer 12 connected across it, and a voltage is tapped from the potentiometer contact arm $13a$ and applied through the resistance 13 to the control electrode or auxiliary anode 14 of thyratron 15.

Connected in series between the terminals C and B with the discharge path including the cathode 16 and anode 17 of the thyratron is the winding 18 of a relay across which a rectifier 19 is connected. The voltage tapped from potentiometer 12 is, moreover, applied across the control electrode 14 and the cathode of the thyratron by way of a condenser 20. Between the terminals C and B there is further connected a contactor device for controlling the operation of the load apparatus to be monitored and including in its circuit a manual push-button switch 22 and a normally open pair of contacts 23 controlled by relay 18. The system described operates as follows:

When sufficient voltage is applied to the auxiliary anode 14, the thyratron fires and one set of alternate semicycles of the voltage between B and C is passed through the relay 18 owing to the provision of rectifier 19, so that the energization of the relay is sustained and the relay closes its contacts 23, whereupon the apparatus can be operated by manual action on switch 22.

Should the phase order be for some reason reversed or a phase be cut off, the voltage between points C and P becomes negligibly low or zero and no firing voltage is applied to the auxiliary anode 14.

In the illustrated embodiment wherein the voltage divider used is inductive in character, the impedance of primary 8 when the secondary 10 is open, is such that the voltage drop in the primary 8 brings the voltage at the tap $13a$ down to a sufficiently low level to prevent firing of the thyratron, even if the voltage $cp$ is at its maximum value. However, should the secondary 10 be shorted by the action of switch 24, the inductive impedance of transformer 8, 10 is lowered and the voltage at tap 13a is increased and permits the thyratron to fire.

Conversely, the inductive impedance presented by the transformer 9, 11 is high when the secondary 11 of this transformer is not in short circuit, so that an appreciable voltage drop capable of firing the thyratron is present across the points C and 13a. However, on actuation of switch 25 to short-circuit the secondary 11, said impedance drops, so that the potential difference between the said points becomes insufficient to fire the thyratron.

Thus it will be seen that firing of the thyratron, and hence operation of the installation being monitored, are only possible if both switch 24 is closed and switch 25 is open, in addition to the order of rotation of the line phases being the correct order.

A wide range of regulating factors or conditions may be made to act on these two switches, such as devices responsive to temperature, pressure, and so on, as well as time-responsive devices, such as clocks or timing mechanisms. Moreover, a plurality of secondaries such as 10 and 11 may be respectively coupled to the primaries 8 and 9 if desired.

It will also be noted that since the secondary impedance as seen from the primary side is equal to the value of said secondary impedance divided by the square of the transformer ratio, it is not necessary that a full short circuit be established across the secondary terminals in order to provide a substantial reduction in the impedance at the primary terminals. Thus it would be sufficient if the secondary is connected across a comparatively high impedance, since the transformer ratio is very high on account of the small number of secondary turns.

There will now be described with reference to FIG. 4, a circuit similar to that of FIG. 3 as applied to the monitoring of a pumping system. The pumping system shown comprises a pump 26 drawing water from a well 27 and discharging it into an overhead reservoir 28. The pump is driven from a three-phase motor 29 connected across the lines L1, L2, L3 by way of the switch arms 30 of a contactor device 21. Fixedly positioned in the well 27 are an upper electrode 31 directly connected to one end of the secondary winding 10 of the monitor circuit previously described, and a lower electrode 32 connected to the same end of the secondary 10 by way of the normally open contacts 33 of relay 18.

Similarly the storage reservoir 28 contains two electrodes fixedly supported in it: an upper electrode 34 directly connected to one end of the secondary 11 and lower electrode 35 connected thereto by way of normally closed auxiliary contacts 36 of contactor 21. The remaining two ends of the secondaries 10 and 11 are interconnected and grounded by way of a lead 37, while the tank 28 is also grounded by way of lead 38.

The secondary 10 is short-circuited regardless of the open or closed condition of the relay contacts 33 should the water level in the well rise above electrode 31, and said secondary is open regardless of the condition of said contacts should the water level in the well drop below electrode 32. Similarly, the secondary 11 is shorted regardless of the condition of contacts 36 should the water level in tank 28 rise above electrode 34 and is open regardless of the condition of said contacts should the tank level drop below electrode 35. The system operates as follows:

So long as there is enough water in the tank 28 to keep the electrode 35 in immersed condition, the secondary 11 is short-circuited by way of the normally closed contacts 36 of the contactor. However, should the water level drop below electrode 35, the short-circuit across secondary 11 is removed; the thyratron cannot fire however unless the secondary 10 is short-circuited, that is, unless the water level in the well 27 is high enough to cover electrode 31. Assuming both these conditions satisfied, the thyratron fires and the pump is started in operation, provided at that time the order of rotation of the line phases L1, L2, L3 is correct, thereby ensuring that the pump will rotate in the proper direction to raise water from the well to the reservoir. If this is the case contactor 21 energizes and the pump is started.

On the pump being started contacts 33 are closed and contacts 36 opened. Hence the rising water in the reservoir 28 will not result in again short-circuiting the secondary 11, until the water level has reached the upper electrode 34 in the tank. When this occurs the thyratron is triggered off and the system is deenergized as explained above with reference to FIG. 3. At the same time, closure of contacts 33 maintains the secondary 10 in short-circuited condition as long as the water in the well 27 does not drop to a level below electrode 32. But should the well run dry the short-circuit is removed from across secondary 10 and the impedance of transformer 8, 10 resumes its high value, so that the thyratron is triggered off.

The net result is that the system is disabled either when the water rises above a prescribed maximum level (electrode 34) in the tank, or when the water drops below a prescribed minimum level (electrode 32) in the well. Thus, the operation of the pumping system is seen to be controlled in response to three conditions: (1) The power supply is in proper condition to ensure that the pump will be driven in the right direction; (2) there is a lack of water in the tank; and (3) there is enough water in the well.

In this system, the provision of a ground conductor 37 for grounding the common junction of secondaries 10 and 11 serves to protect the system from defective insulation in the conductors connecting the other ends of the secondaries with the electrodes. It should be noted in this respect that the liquid resistance short-circuiting said secondaries is of the order of only a few hundred or a few thousand ohms, whereas it would require a very defective condition indeed of the insulation in order for the resistances of the ground connections to drop to a value of say 20,000 ohms. Such a resistance value however, as seen from the primary side of the transformer, is insufficient to bring the inductive impedances to a sufficiently low value to trigger operation of the system.

The system shown in FIG. 4 may, however, be open to the following objection. The system is disabled by grounding the electrode 34, so that a cut-off in the line connecting said electrode to the secondary 11 may result in the reservoir overflowing, since such a cut-off will not prevent the system from being started. Consequently in cases where the line connecting the reservoir electrodes to the secondary 11 is not protected with a fully degree of safety from danger of cut-off, the modified system shown in FIG. 5 may be preferred.

This system in its general lines is similar to that of FIG. 4. However, the reservoir 28 is equipped with a float 39 which, by way of a mechanical transmission 40, operates a switch 41 interposed in the input lead to the secondary 10. The secondary 11 herein is omitted. This system operates as follows:

As the water level drops in the tank, the switch 41 is closed, and this, provided the electrode 31 in the well is underwater, short-circuits the secondary 10 and starts the system in operation. The tank is filled and the float rises to open the switch 41, deenergizing the thyratron and arresting operation of the system. As in the previously described embodiment, should the water level in the well have meanwhile dropped below electrode 32, the short circuit across secondary 10 is omitted and the system is disabled.

Figure 5:
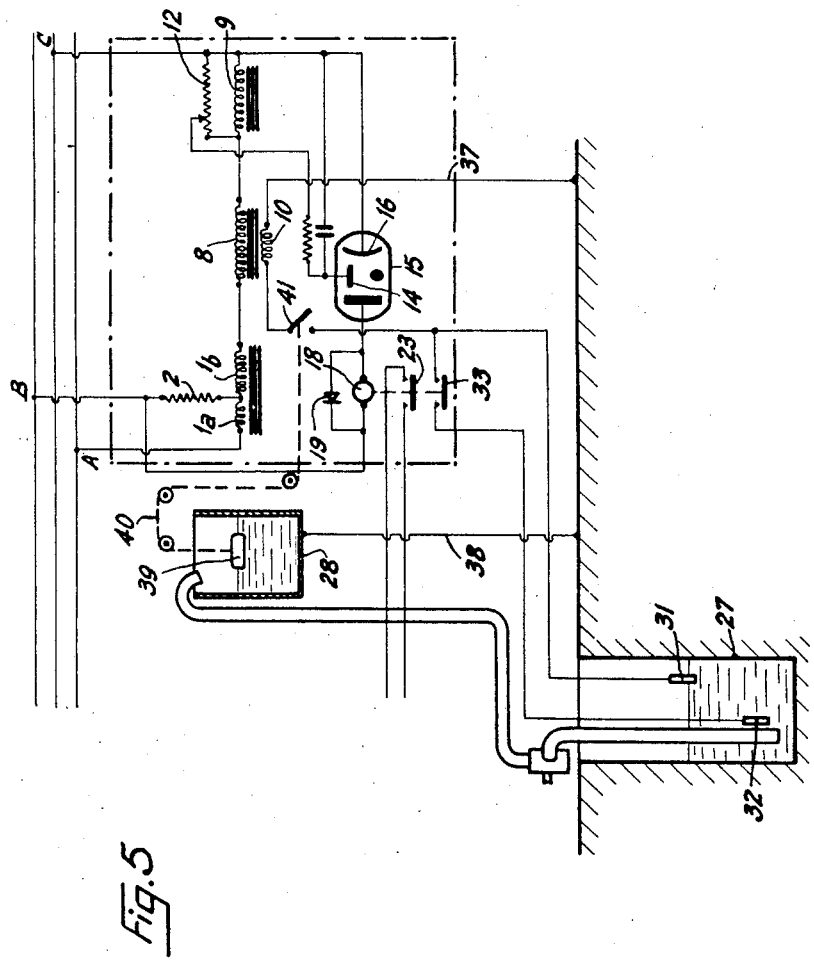
FIG. 5 illustrates a modification of part of FIG. 4.

In both systems shown in FIGS. 4 and 5, the liquid being pumped is assumed to be conductive, whereby the liquid itself can be used as the medium for short-circuiting the secondaries 10 and 11. In cases where the liquid is non-conductive, switches may be substituted for the electrodes at corresponding positions, i.e. 31, 32, 34, 35, and a float system may be provided for operating the switches in a manner corresponding to the operation of the electrodes. In such case, the grounded ends of the secondaries 10 and 11 also lead to these switches. It is desirable however, in the interests of the users' safety, that the ground connection be retained at the connecting junction of secondaries 10 and 11.

It will be understood that various modifications may be made in the arrangements described and shown without departing from the spirit of the invention or the scope of the claims.

What I claim is:

1. A monitoring circuit for use with load apparatus supplied from a three-phase network wherein the operation of said apparatus is to be enabled and disabled in response to at least one selected condition, comprising an autotransformer winding having one end connected to one network phase terminal, a resistance connected between the second network phase terminal and an intermediate tap of said winding, a voltage divider connected between the third network phase terminal and the other end of said winding, said divider comprising at least one high-impedance inductance, an electronic device having an anode electrode, a cathode electrode and a control electrode to vary the anode-cathode conductivity of the device in response to a voltage applied to the control electrode, means connecting said anode and cathode electrodes between said second and third network phase terminals, means connecting said control electrode to a predetermined point of said voltage divider, relay means connected to one of said first two electrodes, switch contacts operated by said relay and connected to said load apparatus to enable and disable said apparatus selectively in response to the degree of conductivity of said electronic device, whereby said apparatus is enabled when the order of network phase rotation is in a normal sense and disabled when said order is in the reverse sense, a low-impedance secondary winding inductively coupled to said voltage divider inductance, and switch means connected to said secondary winding and responsive to said condition for switching said secondary winding between an open and a closed circuit state for selectively enabling and disabling said load apparatus in response to said condition.

2. A monitoring circuit for use with load apparatus supplied from a three-phase network, wherein the operation of said apparatus is simultaneously controlled by at least two selected conditions, comprising an autotransformer winding having one end connected to one network phase terminal, a resistance connected between a second network phase terminal and an intermediate tap of said winding, a voltage divider comprising at least two high inductances connected in series between a third network phase terminal and the other end of said winding, an electronic device having an anode electrode, a cathode electrode and a control electrode to vary the anode-cathode conductivity of the device in response to a voltage applied to the control electrode, means connecting said control electrode to a predetermined point of said divider in closed relationship with the point of connection of both said high inductances, an electromagnetic relay comprising a coil and at least one normally open switch contact, means for serially connecting said coil and said anode and cathode electrodes between said second and third network phase terminals, at least one low-impedance secondary winding inductively coupled to each of said divider inductances, means responsive to one of said selected conditions for opening the circuit of the low-impedance winding which is coupled to the inductance located towards the third network phase terminal, further means responsive to the other of said selected conditions for closing the circuit of the low-impedance winding which is coupled to the inductance located towards said other end of said autotransformer winding, and a control device for enabling and disabling said apparatus controlled by said switch contact of said relay.

3. A monitoring circuit according to claim 2, further comprising a potentiometer shunting the high inductance located towards the third network terminal and wherein the predetermined point of connection to the divider is a tap on said potentiometer.

4. A monitoring circuit according to claim 2, wherein one end of at least one of the secondary windings is grounded.

5. A monitoring circuit according to claim 2, comprising a further normally open switch controlled by the electromagnetic relay, said further switch shunting the circuit-closing means responsive to the said one selected condition, whereby after starting the operation of the apparatus under said one selected condition, said operation proceeds even if said one selected condition ceases to exist.

6. A monitoring circuit according to claim 2, further comprising a normally closed switch controlled by the control device and inserted in series with the circuit-opening means responsive to the said other selected condition, whereby after starting operation of the apparatus under said other selected condition, said operation proceeds even if said other selected condition ceases to exist.

References Cited in the file of this patent

UNITED STATES PATENTS

| | | |
|---|---|---|
| 1,830,450 | Toulon | Nov. 3, 1931 |
| 1,841,765 | Stansbury | Jan. 19, 1932 |
| 1,876,436 | Stansbury | Sept. 6, 1932 |
| 2,246,594 | Kinsella | June 24, 1941 |
| 2,349,849 | Deal | May 30, 1944 |
| 2,358,433 | Wolfner | Sept. 19, 1944 |
| 2,470,661 | Sonnemann | May 17, 1949 |
| 2,739,608 | Brower | Mar. 27, 1956 |
| 2,769,455 | Massey et al. | Nov. 6, 1956 |

FOREIGN PATENTS

| | | |
|---|---|---|
| 335,536 | Great Britain | Sept. 24, 1930 |
| 344,001 | Great Britain | Mar. 2, 1931 |